United States Patent Office 3,129,036
Patented Apr. 14, 1964

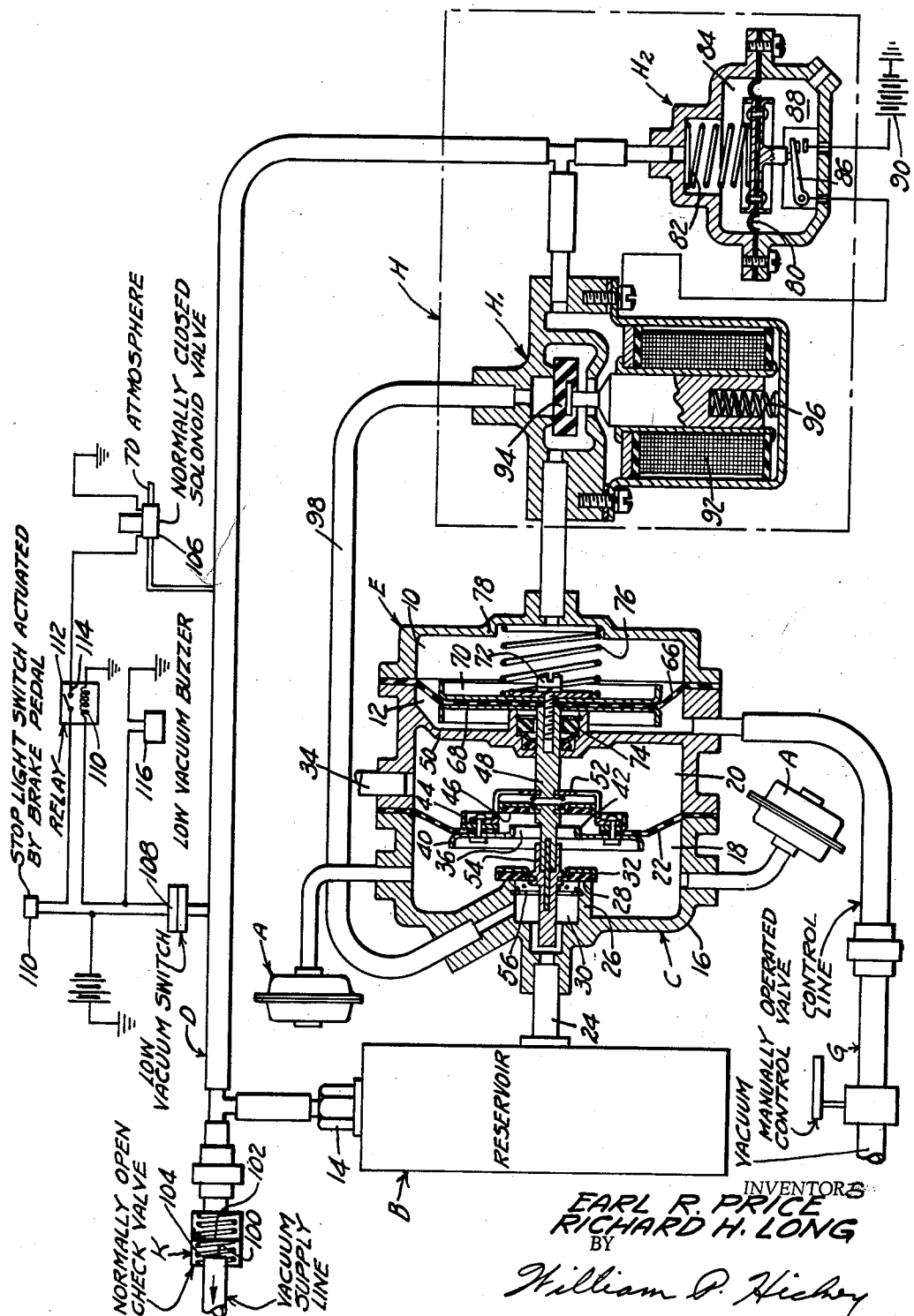

3,129,036
AUTOMATIC BRAKING SYSTEM
Earl R. Price and Richard H. Long, South Bend, Ind., assignors to The Bendix Corporation, South Bend, Ind., a corporation of Delaware
Filed Jan. 2, 1962, Ser. No. 163,537
3 Claims. (Cl. 303—31)

The present invention relates to pneumatic actuated remote control systems; and more particularly to pneumatic braking systems for tractor-trailer vehicles and the like.

In the type of remotely controlled pneumatic actuated braking system shown in the Earl R. Price Patent 2,871,064, the pneumatic supply line is used to both energize a remotely located reservoir that is used to actuate the remotely located brake applying fluid pressure motors, and the remotely located control valve that controls the communication between the reservoir and the brake applying fluid pressure motors. In the specific system shown in the Earl R. Price Patent 2,871,064, vacuum from the vehicle's propelling engine is used as a pneumatic power supply to the service line; and vacuum of the same intensity is simultaneously communicated to the control valve through a vacuum submerged control line. Unbalance in pressure between the control line and service line is normally used to control the actuation of the remotely located control valve. Inasmuch as vacuum produced by the vehicle's propelling engine fluctuates considerably during normal use, a check valve is used in the supply line to the remotely located reservoir to maintain maximum vacuum in the remotely located reservoir.

As previously indicated, the control valve used is actuated by a control motor which utilizes unbalance in pressure between the control line and service line so that the degree of brake actuation which the system produces decreases as the vacuum that is supplied to the control motor through the service line decreases. The system taught by the Earl R. Price Patent 2,871,064 provides automatic means for automatically communicating the trapped vacuum in the reservoir to the control motor at a predetermined intermediate level of vacuum. This predetermined level of vacuum will preferably be closer to atmospheric pressure than are the normal fluctuations in the service line.

One of the difficulties of the system shown in the Earl R. Price Patent 2,871,064 is that impared vehicle braking effort is had at levels of vacuum just above the predetermined level previously referred to because the means H has not as yet communicated reservoir vacuum to the control motor and the control motor will not completely actuate the brake applying motor with the degree of vacuum existing in the service line. Accordingly a principle object of the present invention is the provision of an improved braking system of the type shown in the Earl R. Price Patent 2,871,064, wherein the operator can manually cause a complete actuation of the control motor at levels of vacuum just above the predetermined level set for automatic actuation so that the brake actuating motors can be actuated with the maximum vacuum that is available in the remote reservoir.

The invention resides in certain constructions, and combinations and arrangement of parts, and further objects and advantages will be apparent to those skilled in the art to which the invention relates from the following description of the preferred embodiment described with reference to the accompanying drawing forming a part of this specification, and in which the single figure of the drawing is a generally schematic view, with parts in section, of a portion of a braking system embodying principles of the present invention.

The braking system shown in the drawing is of a type adapted to be used on a trailer of a tractor-trailer combination vehicle. The system generally comprises a pair of vacuum actuated, brake applying fluid pressure motors (or dishpans) A, to which vacuum is communicated from a reservoir B by means of a control valve C. Vacuum is supplied to the reservoir B from the tractor (not shown) by means of a vacuum supply line D. The control valve C is operated by means of a normally vacuum suspended double acting fluid pressure actuated control motor E having opposed chambers 10 and 12 normally energized with vacuum. Chamber 10 is supplied by the vacuum supply line D, and chamber 12 is supplied by a normally vacuum suspended control line G leading to the tractor.

The fluid pressure motor E is so arranged that a pressure rise in the control line G applies the brakes of the vehicle. The brakes of the trailer will normally be applied by bleeding air into the control line G through an operator operated control valve J (of the type shown in Patent 2,719,609) mounted on the tractor; and automatically in an emergency upon a leak or break in the control line G. This will be true so long as chamber 10 is energized with vacuum. Means H is provided in the present invention to assure a vacuum supply to chamber 10 even upon failure of the vacuum supply line D.

The dishpans A are of well known construction and will not further be described. Maximum service vacuum is maintained in the reservoir B at all times by means of a check valve 14 in the supply line D which closes off the reservoir B whenever vacuum in the supply line D decreases below that existing in the reservoir.

As previously indicated, operation of the dishpans A is regulated by the control valve C. Control valve C generally comprises a body member 16 having a pair of opposed chambers 18 and 20 separated by a movable wall or diaphragm 22. Vacuum from the reservoir B is conducted to control chamber 18 by the vacuum inlet tube 24. An internal annular boss 26 having a valve seat 28 on the end thereof projects into the control chamber 18 to form a small vacuum chamber 30. Vacuum flow into the chamber 18 is controlled by a poppet 32 adapted to bear against valve seat 28; and air pressure is continually admitted to chamber 20 through inlet tube 34.

The diaphragm 22 is provided with an opening 36 therethrough opposite the vacuum valve seat 28 to permit atmospheric pressure from air chamber 20 to be admitted to the control chamber 18. An annular plate 40 having a valve seat 42, surrounds the central opening of the diaphragm 22 and is affixed thereto by means of rivets and a back-up plate 44. The dishpans A are connected to the control chamber 18, and the flow of air into the control chamber 18 is controlled by an atmospheric poppet 46. Actuation of the poppet is achieved by means of a valve stem 48 which extends externally of the end wall 50 of the valve chamber and which is attached to the diaphragm back-up plate 44 by a spider 52. The spider 52 surrounds and guides the atmospheric poppet 46, and the poppets 32 and 46 are affixed to another valve stem 54 which in turn is guided adjacent the poppet 32 by means of a coil spring 56. Outward movement of valve stem 48 causes the annular diaphragm plate 40 to pick up the atmospheric poppet 46 thereby closing off atmospheric communication with the control chamber 18, and to thereafter lift the poppet 32 from its seat to admit vacuum to the control chamber.

The control valve C is adapted to be controlled remotely from the tractor of the vehicle by means of the fluid pressure motor E integrally attached to the end wall 50 of the control valve. As previously indicated, the fluid pressure motor E has a pair of opposed chambers 12 and 10 separated by a movable wall or diaphragm 66. The diaphragm 66 is attached to the valve stem 48 as by stiffening plates 68 and 70 and machine screw 72, and a vacuum seal 74 is provided around the stem 48. Supply vacuum is continually admitted to the rearwardly positioned chamber 10 as will later be described, and actuation of the motor is effected by a normally vacuum submerged control line G introduced into the forward chamber 12. Upon bleeding air into the control line G, a differential is produced across diaphragm 66 and the valve stem 48 is moved rearwardly in the manner above described. A spring 76 is positioned between the diaphragm 66 and the end wall 78 of the motor to return the valve to its forward or normal position.

As previously mentioned, vacuum is continually supplied to the rearmost opposed diaphragm chamber to keep it energized at all times, such that the motor E will be actuated whenever atmospheric pressure is bled to the forward opposed diaphragm chamber 12. This is accomplished by means of a three way solenoid valve $H_1$, which in the position shown normally communicates vacuum from the service line D to the rearmost chamber 10.

A sensing device $H_2$ is also connected to the service line D to detect de-energization, or vacuum fall off, below a predetermined level. The sensing device $H_2$ shown comprises a diaphragm switch having a diaphragm 80 one side of which is subjected to the service vacuum and the other side of which is exposed to atmospheric pressure or ambient conditions. A spring 82 is positioned in the vacuum chamber 84 of the switch, and an electrical switch 86 is positioned in the atmospheric chamber 88 of the switch in such manner that the switch 86 will be closed by the action of spring 82 when the service vacuum decreases below a predetermined level. Because diaphragm 80 is interpositioned between the service vacuum line D and ambient conditions, the predetermined energy level at which switch 86 is actuated or triggered will be an absolute level not variable or dependent upon other conditions of the system. Upon triggering of the switch 86, an electrical circuit is established from battery 90 to ground through coil 92 of the solenoid valve $H_1$. Valve 94 normally held in the first position shown by means of spring 96, is thereupon snapped into its second position, closing off communication between opposed motor chamber 10 and the service line D, and establishing communication between chamber 10 and reservoir B through line 98 and vacuum chamber 30. Motor E is thereupon energized with full vacuum and a complete application of the brakes can be obtained if atmospheric pressure is admitted to motor chamber 12.

As previously indicated, the system shown in the drawing is a vacuum submerged system in which the service line D and control G are normally energized with vacuum of the same intensity. It is a characteristic of such systems, that a small leak somewhere in the system can travel through open valving in the tractor and lower the vacuum in both lines D and G substantially equally. Should this occur in the system shown in the drawing, motor chambers 12 and 10 would become pressurized by equal amounts until the previously referred to predetermined absolute level at which sensing device $H_2$ is tripped. Upon tripping of the sensing device, full vacuum from the reservoir is applied to motor chamber 10 to provide a differential pressure across its diaphragm 66 and thereby automatically partially apply the brakes of the trailer. Should this not be fast enough to meet an emergency, full atmospheric pressure can be applied to motor chamber 12 through control line G by conventional valving in the tractor of the vehicle. It will also be observed that the embodiment shown in the drawing automatically and under all conditions assures an emergency application of the trailer's brakes whenever failure of the interconnecting lines occurs.

As previously indicated, one of the deficiencies of the system so far described is that only a partial application of the brakes can be had at levels of vacuum slightly above the predetermined level at which means H communicates vacuum from the reservoir B to the chamber 10 of the control motor E. At vacuum levels just above the predetermined level at which the means H operates, only a partial vacuum exists in the chamber 10 so that even though full atmospheric pressure is communicated to the chamber 12 through the control line G insufficient differential pressure is applied across its diaphragm 66 to cause the vacuum of the reservoir B to be admitted to the dishpans A. The driver of the vehicle under such conditions is therefore unable to produce a complete actuation of the dishpans A at levels of vacuum slightly above the "set point" or predetermined level at which the automatic means H is actuated.

The service line D is normally provided with a normally opened check valve structure K which permits the slow passage of air in either direction therethrough, but which upon a sudden break or large leak in the service line D, causes the check valve K to be closed. The check valve K generally comprises a seat 100 surrounding its vacuum inlet and against which its closure member 102 abuts to prevent airflow towards the tractor portion of the vehicle. The closure member 102 is normally held a slight distance off of its seat 100 by means of a coil spring 104, and sufficient clearance exists between the periphery of the valve closure member 102 and the valve body to permit a normal slow passage of air around the valve closure member 102. Should a rupture in the line D occur, valve closure member 102 is forced up against the valve seat 100 to prevent further airflow to the tractor portion of the vehicle.

According to further principles of the present invention means are provided for dumping air pressure into the service line D at levels of vacuum just above the predetermined set point of the automatic brake applying means H. This means is under the control of the operator so that it will not automatically apply the brakes of the vehicle, as does the automatic applying means H, but will permit the operator to initiate a full application of the trailer's brakes if he so desires. The means shown in the drawing generally comprises a normally closed valve 106 which is opened when actuated to dump atmospheric pressure into the vacuum service line D to thereby cause the automatic means H to communicate vacuum from the reservoir B to the opposing chamber 10 of the fluid pressure control motor E. Any suitable means may be provided for opening the normally closed valve 106 at vacuum levels just above the "set point" for control means H. As shown in the drawing, the valve 106 is solenoid operated and a low vacuum switch 108 is provided in electrical series circuit with the usual electric stoplight switch 110. The stoplight switch 110 is a normally open switch that is closed when a brake application is made. The low vacuum switch 108 is a normally open switch which is closed at a vacuum level above the "set point" for the control means H. The vacuum level at which the switch 108 is closed, will preferably be at a level sufficiently high to permit the control motor E to produce a substantially complete brake actuation. The low vacuum switch 108 is in series electrical circuit with the armature 110 of a relay 112 so that the contacts 114 of the normally opened relay 112 are closed when the vacuum in the vacuum service line D falls to the "set point" of the low vacuum switch 108. The contacts 114 are in electrical series circuit with respect to the solenoid of the normally closed valve 106 and with the normally open stoplight switch 110 so that should the operator operate the brakes at the time the low vacuum switch 108 is made, normally closed valve 106 will be opened to dump atmospheric pressure to the automatic brake applying means H. This causes the automatic brake applying means H to communicate the full vacuum from the reservoir B to the opposing chamber 10 of the control valve so that a full actuation of the trailer's brakes will be had.

In some instances it will also be desirable to place a low vacuum buzzer 116 in electrical series circuit with the low vacuum switch 108 to notify the operator of the vehicle that a low vacuum condition exists in his vacuum service line. This lets the operator know that he is depending upon the vacuum trapped in his remotely located reservoir B to actuate the trailer's brakes so that he will not make a plurality of brake applications before correcting the low vacuum condition.

From the foregoing description of the preferred embodiment of the invention, it will be apparent that the objects heretofore enumerated as well as others have been accomplished. While the preferred embodiment has been shown and described in detail, the invention is not limited to the particular construction shown or described, and it is my intention to cover hereby all adaptations, modifications and uses thereof which come within the practice of those skilled in the art to which the invention relates.

We claim:

1. In a pneumatic control system for automotive braking and the like: a fluid pressure motor actuated by the application of a pressure differing from atmosphere; a normal but fluctuable source of said pressure differing from atmosphere; a reservoir supplied by said fluctuable source of said pressure differing from atmosphere; check valve means interpositioned between said reservoir and said source for closing off communication therebetween when the intensity of said source falls below that existing in said reservoir; a control valve having a movable element which opens and closes communication of said fluid pressure motor with atmosphere and said reservoir; a fluid pressure actuated control motor having a movable wall therein which operates said movable element and which movable wall separates opposing pressure chambers in said motor; a control line communicating with one of said opposing chambers; a normal supply line for communicating the other of said opposing chambers with said source; said control motor being arranged to cause said movable element to close communication between said reservoir and said first mentioned fluid pressure motor when pressures of substantially equal intensities exist in said opposing chambers, and to cause said movable element to open communication between said reservoir and said fluid pressure motor when atmospheric pressure is bled into said one opposing chamber and said differing pressure exists in said other opposing chamber; means for communicating said normal supply line to said other opposing chamber when the differential pressure between said normal supply line and atmosphere exceeds a predetermined amount and for communicating said reservoir to said other opposing chamber when said differential pressure is below said predetermined amount; manually operated means modulating atmospheric pressure to said control line; a normally closed dump valve for dumping atmospheric pressure to said supply line; and means sensing said fluctuable source of pressure and actuated at a second differential pressure between said normal supply and atmosphere which somewhat exceeds said first predetermined amount to place said normally closed dump valve under the control of said manually operated means.

2. In a pneumatic conrol system for automotive braking and the like: a fluid pressure motor actuated by the application of a pressure differing from atmosphere; a normal but fluctuable source of said pressure differing from atmosphere; a reservoir supplied by said fluctuable source of said pressure differing from atmosphere; check valve means interpositioned between said reservoir and said source for closing off communication therebetween when the intensity of said source falls below that existing in said reservoir; a control valve having a movable element which opens and closes communication of said fluid pressure motor with atmosphere and said reservoir; a fluid pressure actuated control motor having a movable wall therein which operates said movable element and which movable wall separates opposing pressure chambers in said motor; a control line communicating with one of said opposing chambers; a normal supply line for communicating the other of said opposing chambers with said source; said control motor being arranged to cause said movable element to close communication between said reservoir and said first mentioned fluid pressure motor when pressures of substantially equal intensities exist in said opposing chambers, and to cause said movable element to open communication between said reservoir and said fluid pressure motor when atmospheric pressure is bled into said one opposing chamber and said differing pressure exists in said other opposing chamber; valve means having a movable two position control element, said valve means communicating said normaly supply line to said other opposed chamber when said movable element is in one position, and communicating said reservoir to said other opposed chamber when said movable element is in its other position; means powered by an energy supply which is independent of the above fluid pressure system for moving said movable element from said one position to said other position when the pressure differential between said source and atmosphere decreases below a predetermined level; brake pedal lever operated means modulating atmospheric pressure to said control line; a solenoid operated dump valve for dumping atmospheric pressure to said supply line; first switch means sensing said fluctuable source of pressure and actuated at a second differential pressure between said normaly supply and atmosphere which somewhat exceeds said first predetermined amount, second switch means actuated when said brake pedal is actuated, and said first and second switch means connected with said solenoid operated dump valve to actuate said dump valve only when both switch means are actuated.

3. In a pneumatic control system for automotive braking and the like: a normally atmospheric suspended fluid pressure motor actuated by the application of vacuum; a normal but fluctutable source of vacuum; a reservoir supplied by said vacuum source; check valve means interpositioned between said reservoir and said source preventing pressure inflow to said reservoir from said source; a control valve having a movable element which opens and closes communication of said fluid pressure motor with atmosphere and said reservoir; a fluid pressure actuated control motor having a movable wall therein which operates said movable element and which movable wall separates opposing pressure chambers in said motor; a normally vacuum suspended control line communicating with one of said opposing chambers; a normal vacuum supply line for communicating the other of said opposing chambers with said source; said control motor being arranged to cause said movable element to close communication between said reservoir and said first mentioned fluid pressure motor when vacuums of substantially equal intensities exist in said opposing chambers, and to cause said movable element to open communication between said reservoir and said fluid pressure motor when the pressure in said one opposing chamber is greater than in said other opposing chamber; means for automatically communicating said normal supply line to said other opposing chamber when the differential pressure between said normal supply line and atmosphere exceeds a first predetermined amount and for communicating said reservoir to said other opposing chamber when said differential pressure is below said predetermined amount; manually operated means modulating atmospheric pressure to said control line; a normally closed dump valve for dumping atmospheric pressure to said supply line; and means sensing said fluctuable source of pressure and actuated at a second differential pressure between said normaly supply and atmosphere which somewhat exceeds said first predetermined amount to place said normally closed dump valve under the control of said manually operated means.

References Cited in the file of this patent

UNITED STATES PATENTS 2,871,064    Price _____ Jan. 27, 1959